(12) United States Patent
Irie et al.

(10) Patent No.: US 12,417,696 B2
(45) Date of Patent: Sep. 16, 2025

(54) INFORMATION PROCESSING APPARATUS, INFORMATION ANALYSIS SYSTEM, AND MEASUREMENT METHOD

(71) Applicants: THE UNIVERSITY OF TOKYO, Tokyo (JP); Premo, Inc., Tokyo (JP)

(72) Inventors: Hidetsugu Irie, Tokyo (JP); Junichiro Kadomoto, Tokyo (JP); Hidenori Tsuji, Tokyo (JP); Junta Miyamoto, Tokyo (JP)

(73) Assignees: THE UNIVERSITY OF TOKYO, Tokyo (JP); PREMO, INC., Tokyo (JP)

( * ) Notice: Subject to any disclaimer, the term of this patent is extended or adjusted under 35 U.S.C. 154(b) by 0 days.

(21) Appl. No.: 18/398,931

(22) Filed: Dec. 28, 2023

(65) Prior Publication Data

US 2024/0127692 A1 Apr. 18, 2024

Related U.S. Application Data

(63) Continuation-in-part of application No. PCT/JP2023/018826, filed on May 19, 2023.

(30) Foreign Application Priority Data

May 23, 2022 (JP) .................. 2022-083509

(51) Int. Cl.
G08C 19/08 (2006.01)
(52) U.S. Cl.
CPC .................. *G08C 19/08* (2013.01)
(58) Field of Classification Search
None
See application file for complete search history.

(56) References Cited

U.S. PATENT DOCUMENTS

| 5,763,783 A | 6/1998 | Asada | |
| 2011/0185091 A1* | 7/2011 | Rofougaran | G06F 9/50 710/106 |

(Continued)

FOREIGN PATENT DOCUMENTS

| JP | S63-271112 A | 11/1988 |
| JP | S64-023132 A | 1/1989 |

(Continued)

*Primary Examiner* — Fekadeselassie Girma
(74) *Attorney, Agent, or Firm* — HAUPTMAN HAM, LLP

(57) ABSTRACT

An apparatus includes first and second chips. The first chip includes a first transmission control portion to generate a transmission signal, and a first transmitting coil connected to the first transmission control portion to transmit the transmission signal. The second chip includes a second receiving coil capable of receiving the transmission signal by being inductively coupled with the first transmitting coil, and a second detection portion to detect a voltage or current applied to the second receiving coil. The first and second chips are in close proximity to enable wireless communication through inductive coupling. The second detection portion is configured to detect, when a change in voltage or current occurring in the second receiving coil satisfies a predetermined condition, a change in relative position between the first chip and the second chip, or vibration applied to the first and second chips, pressure change, temperature change, or electromagnetic wave.

19 Claims, 10 Drawing Sheets

(56) References Cited

U.S. PATENT DOCUMENTS

| | | | | |
|---|---|---|---|---|
| 2014/0067233 A1* | 3/2014 | Nishida | ............ | F02D 41/30 |
| | | | | 701/103 |
| 2015/0115728 A1* | 4/2015 | Yamamoto | ............ | H02J 50/60 |
| | | | | 307/104 |
| 2018/0080796 A1 | 3/2018 | Roos | | |
| 2022/0415569 A1 | 12/2022 | Irie et al. | | |

FOREIGN PATENT DOCUMENTS

| | | |
|---|---|---|
| JP | 2018-066724 A | 4/2018 |
| JP | 2018-084502 A | 5/2018 |
| JP | 2021-087044 A | 6/2021 |
| WO | 9619733 A1 | 6/1996 |

\* cited by examiner

INFORMATION PROCESSING APPARATUS, INFORMATION ANALYSIS SYSTEM, AND MEASUREMENT METHOD

RELATED APPLICATIONS

The present application is a continuation application of International Application No. PCT/JP2023/018826 filed May 19, 2023, which claims priority to Japanese Application No. 2022-083509, filed May 23, 2022. The entire contents of the above-referenced applications are incorporated by reference herein.

FIELD

This invention relates to an information processing apparatus, an information analysis system, and a measurement method.

BACKGROUND

An information processing apparatus has been proposed in which a plurality of chips having coils are horizontally integrated. The chips communicate with each other wirelessly using inductive coupling occurring between the coils, and the information processing apparatus is thus capable of flexibly responding to mounting shape and shape variation (see Patent Literature 1, for example).

Citation List

PATENT LITERATURE

[Patent Literature 1] Japanese Patent Application Laid-open No. 2021-87044

SUMMARY

Technical Problem

Detection of state quantities requires a sensing device and an information processing apparatus that obtains the detection signals of the sensing device as digital data.

Although Patent Literature 1 discloses an information processing apparatus that can flexibly respond to changes in mounting shape and form by performing wireless communication between chips using inductive coupling that occurs between coils, the information processing apparatus does not have a sensing function, and it is necessary to additionally connect a sensing device to the information processing apparatus to detect a state quantity.

The present invention is made in view of the foregoing background, and an object of the present invention is to provide an information processing apparatus having a sensing function and an information processing function.

Solution to Problem

To achieve the above object, provided is an information processing apparatus including at least a first chip and a second chip, in which the first chip includes a first transmission control portion configured to generate a transmission signal and a first transmitting coil that is connected to the first transmission control portion and configured to transmit the transmission signal, the second chip includes a second receiving coil capable of receiving the transmission signal by being inductively coupled with the first transmitting coil and a second detection portion configured to detect a voltage or current applied to the second receiving coil, the first chip and the second chips are positioned in close proximity to each other that enables wireless communication through inductive coupling, the second detection portion is configured to detect, when a change in voltage or current occurring in the second receiving coil satisfies a predetermined condition, a change in relative position between the first chip and the second chip, or vibration applied to the first and second chips, pressure change, temperature change, or electromagnetic wave.

Other issues and their solutions disclosed in this application will be clarified in the Description of Embodiment and the drawings.

Advantageous Effects of Invention

According to the present invention, an information processing apparatus having a sensing function and an information processing function can be provided.

BRIEF DESCRIPTION OF DRAWINGS

FIG. 3-1 is a diagram illustrating a change in the positional relationship of a transmitting coil 122 and a receiving coil 111 placed on the two chips of the present embodiment.

FIG. 3-2 is a diagram illustrating a change in the positional relationship of the transmitting coil 122 and the receiving coil 111 placed on the two chips of the present embodiment.

FIG. 3-3 is a diagram illustrating a change in the positional relationship of the transmitting coil 122 and the receiving coil 111 placed on the two chips of the present embodiment.

FIG. 3-4 is a diagram illustrating a change in the positional relationship of the transmitting coil 122 and the receiving coil 111 placed on the two chips of the present embodiment.

FIG. 4 is a diagram illustrating an example of a detailed mount circuit of the information processing apparatus 100 of the present embodiment.

FIG. 12-1 is a diagram illustrating a change in the positional relationship of a transmitting coil 122 and a receiving coil 111 placed on the two chips of Example 3.

FIG. 12-2 is a diagram illustrating a change in the positional relationship of the transmitting coil 122 and the receiving coil 111 placed on the two chips of Example 3.

FIG. 12-3 is a diagram illustrating a change in the positional relationship of the transmitting coil 122 and the receiving coil 111 placed on the two chips of Example 3.

FIG. 12-4 is a diagram illustrating a change in the positional relationship of the transmitting coil 122 and the receiving coil 111 placed on the two chips of Example 3.

DESCRIPTION OF EMBODIMENTS

Figure 1:
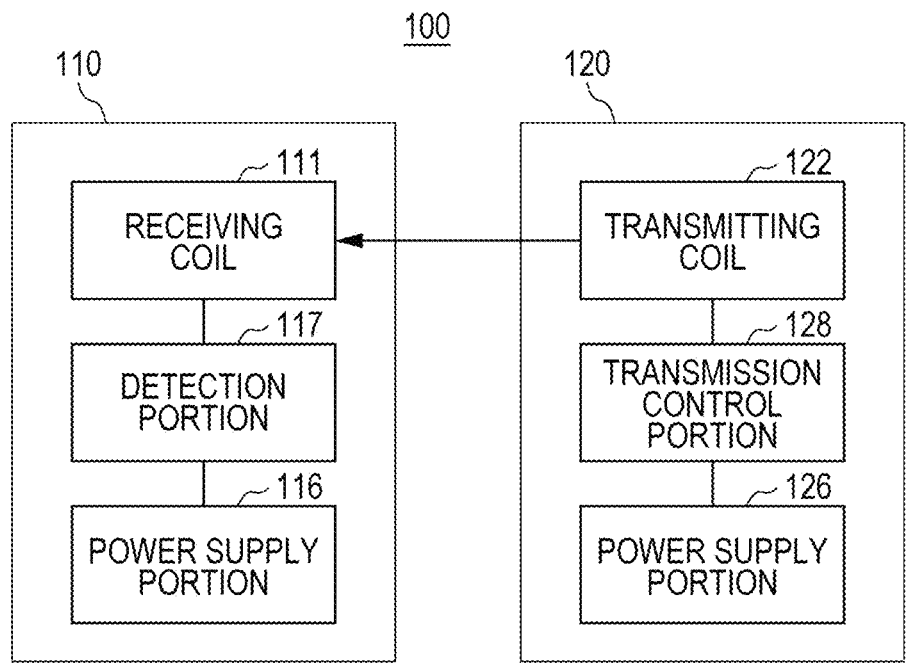
FIG. 1 is a diagram illustrating the functional configuration of an information processing apparatus 100 of the present embodiment.

The contents of embodiments of the present invention are listed and described. The invention includes the following configurations, for example.

[Item 1]

An information processing apparatus including at least a first chip and a second chip, in which the first chip includes a first transmission control portion configured to generate a transmission signal and a first transmitting coil that is connected to the first transmission control portion and configured to transmit the transmission signal, the second chip includes a second receiving coil capable of receiving the transmission signal by being inductively coupled with the first transmitting coil and a second detection portion configured to detect a voltage or current applied to the second receiving coil, the first chip and the second chips are positioned in close proximity to each other that enables wireless communication through inductive coupling, and the second detection portion is configured to detect, when a change in voltage or current occurring in the second receiving coil satisfies a predetermined condition, a change in relative position between the first chip and the second chip, or vibration applied to the first and second chips, pressure change, temperature change, or electromagnetic wave.

[Item 2]

The information processing apparatus according to Item 1, in which the second detection portion is configured to detect, when the amplitude of a voltage or current generated when the second receiving coil receives the transmission signal increases or decreases from a predetermined value, a change in relative position between the first chip and the second chip, or vibration applied to the first and second chips, pressure change, temperature change, or electromagnetic wave.

[Item 3]

The information processing apparatus according to Item 1 or 2, in which the second chip further includes a second transmitting coil and a memory configured to record therein detection information of the voltage or current detected by the second detection portion.

[Item 4]

The information processing apparatus according to Item 3 further including, in addition to the first and second chips, a third chip including a third transmitting antenna a third receiving antenna, and an external communication control portion configured to communicate with an external communication device, and the third chip is configured to receive the detection information via the third receiving antenna and output the detection information to the external communication device through the external communication control portion.

[Item 5]

The information processing apparatus according to Item 1, in which the detection portion is configured with a CPU.

[Item 6]

The information processing apparatus according to Item 1, in which the first chip and the second chip are arranged adjacent to each other on a base material, and the first transmitting coil and the second receiving coil are arranged side by side substantially in a horizontal direction.

[Item 7]

The information processing apparatus Item 1, in which the first chip and the second chip are disposed adjacent to each other and at positions directly opposite each other with a base material interposed therebetween, and the first transmitting coil and the second receiving coil are disposed at positions directly opposite each other.

[Item 8]

The information processing apparatus according to Item 7, in which
  one of the first and second chips is disposed on side of a rotor of a rotary member,
  the other of the first and second chips is disposed on side of a stator of the rotary member, and
  the rotor is configured to rotationally move relative to the stator so as to repeat a relative position state in which the first transmitting coil and the second receiving coil are directly opposite each other and a relative position state in which the first transmitting coil and the second receiving coil are not directly opposite each other.

[Item 9]

An information processing apparatus including a plurality of chips that can wirelessly communicate with one another, in which
  each chip includes
    a transmission control portion configured to generate a transmission signal,
    a transmitting coil that is connected to the transmission control portion and configured to transmit the transmission signal,
    a receiving coil configured to receive the transmission signal from another chip, and
    a detection portion configured to detect a voltage or current of the receiving coil,
    the detection portion is configured to detect, when the host chip is positioned in close proximity to another chip that enables wireless communication with each other through inductive coupling and a change in voltage or current occurring in the receiving coil satisfies a predetermined condition, a change in relative position between the host chip and another chip, or vibration applied to the host chip, temperature change, pressure change, or electromagnetic wave.

[Item 10]

The information processing apparatus according to Item 9, in which the detection portion is configured to detect, when the amplitude of a voltage or current generated when the receiving coil receives the transmission signal increases or decreases from a predetermined value, a change in relative position between the first chip and the second chip, or vibration applied to the first and second chips, pressure change, temperature change, or electromagnetic wave.

[Item 11]

An information analysis system including an information processing apparatus including first and second chips positioned in close proximity to each other that enables wireless communication through inductive coupling and an analysis apparatus configured to analyze information obtained from the information processing apparatus, in which the first chip includes a first transmission control portion configured to generate a transmission signal and a first transmitting coil that is connected to the first transmission control portion and configured to transmit the transmission signal, the second chip includes a second receiving coil capable of receiving the transmission signal by being inductively coupled with the first transmitting coil and a second detection portion configured to detect a voltage or current applied to the second receiving coil, and the analysis apparatus is configured to obtain information on a voltage or current detected by the detection portion and detect, when a change in voltage or current contained in the information satisfies a predetermined condition, a change in relative position between the first chip and the second chip, or vibration applied to the first and second chips, pressure change, temperature change, or electromagnetic wave.

[Item 12]

The information analysis system according to Item 11, in which the analysis apparatus is configured to detect, when the amplitude of the voltage or current contained in the information increases or decreases from a predetermined value, a change in relative position between the first chip and the second chip, or vibration applied to the first and second chips, pressure change, temperature change, or electromagnetic wave.

[Item 13]

A measurement method using a first chip and a second chip that are positioned in close proximity to each other that enables wireless communication through inductive coupling, the method including the steps of generating a transmission signal with the first chip, transmitting the transmission signal from a transmitting coil provided on the first chip, receiving the transmission signal with a receiving coil provided on the second chip, and detecting, when a change in voltage or current occurring in the receiving coil satisfies a predetermined condition, a change in relative position between the first chip and the second chip, or vibration applied to the first and second chips, pressure change, temperature change, or electromagnetic wave.

[Item 14]

The measurement method according to Item 13, in which the predetermined condition is that the amplitude of a voltage or current generated when the receiving coil receives the transmission signal increases or decreases from a predetermined value.

Details of Embodiments

A specific example of an information processing apparatus 100 according to one embodiment of the present invention is described below with reference to the drawings. The invention is not limited to these examples, but is indicated by the claims, which are intended to include all modifications within the meaning and scope equivalent to the claims. In the following description, identical or similar elements will be given identical or similar reference numerals and names in the accompanying drawings, and redundant descriptions of identical or similar elements may be omitted in the description of each embodiment. The features illustrated in each embodiment are applicable to other embodiment provided they do not contradict each other.

Example 1

FIG. 1 is a diagram illustrating an example of a functional configuration of an information processing apparatus 100 of the present embodiment. As illustrated in FIG. 1, the information processing apparatus 100 of the present embodiment includes at least two chips 110 and 120. The chip 120 includes a transmitting coil 122, a transmission control portion 128, which supplies transmission signals to the transmitting coil, and a power supply portion 126, which supplies power to the transmission control portion. The chip 110 includes a receiving coil 111, which is inductively coupled to the transmitting coil 122 so that a voltage (or current) is generated, and a detection portion 117, which detects the voltage or current (analog signal) generated in the receiving coil as a digital signal, and a power supply portion 116, which supplies power to the detection portion 117. The detection portion detects the voltage or current generated in the receiving coil and, based on the detected value, detects changes in the voltage or current caused by changes in the positional relationship between the chips 110 and 120, along with signals transmitted from the transmitting coil. Here, the power supply portions 116 and 126 have at least one of a power receiving function that receives power from outside the chip, a power storing function that stores power inside the chip, or a power generating function that generates power inside the chip. The transmission control portion 128 of the chip 120 may be configured with a CPU, and the detection portion 117 of the chip 110 may also be configured with the CPU.

Figure 2:
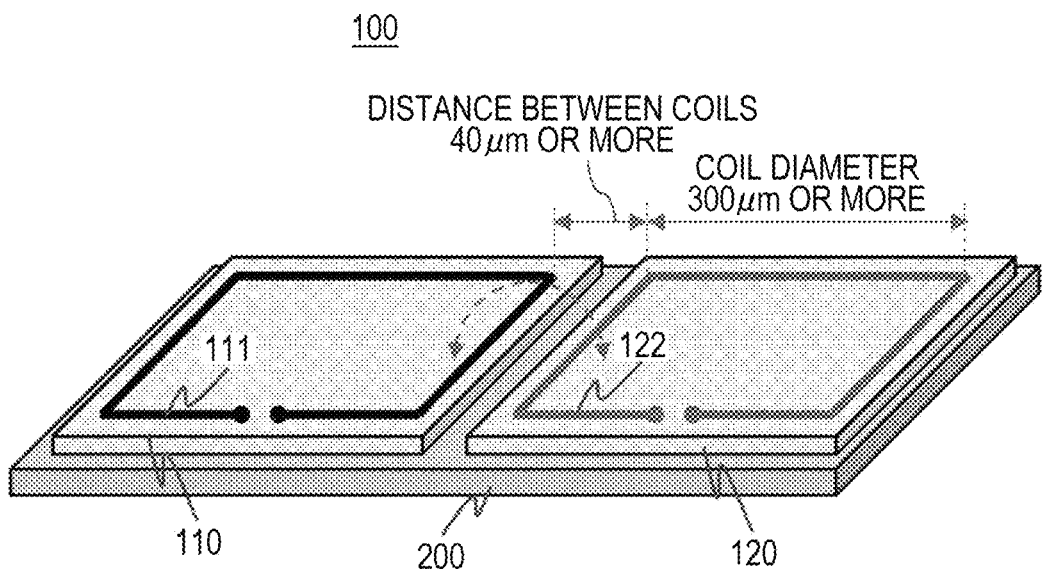
FIG. 2 is a hardware configuration diagram for illustrating the principle of wireless communication between chips of the information processing apparatus 100 of the present embodiment.

FIG. 2 is a hardware configuration diagram for illustrating the principle of wireless communication between chips. The chip 120 includes, at its periphery, a transmitting coil 122 connected to the power supply portion, and the chip 110 includes a receiving coil 111 at its periphery. As illustrated in FIG. 2, the chips 110 and 120 are positioned in close proximity to each other to enable wireless communication between the chips through inductive coupling. They may be miniaturized such that the chip diameter of each chip is about 300 μm and the distance between the coils of adjacent chips is about 40 μm.

FIG. 2 illustrates an example in which the chips 110 and 120 are fixed on the same base material 200 so that the chips are placed at a distance that enables inductive coupling. This base material may be formed by a soft cloth used for clothing or the like, or a deformable elastic member, for example. In this case, deformation of the base material changes the positional relationship between the chips 110 and 120. As a result, not only a change in the current in the transmitting coil, but also a change in the positional relationship between the chips 110 and 120 changes the voltage or current in the receiving coil. As such, a change in the positional relationship between the chips can be detected by detecting, with the detection portion, a change in the voltage or current occurring in the receiving coil due to a change in the positional relationship between the chips.

<Principle of Detection of Positional Relationship Change>

Figures 1, 3:
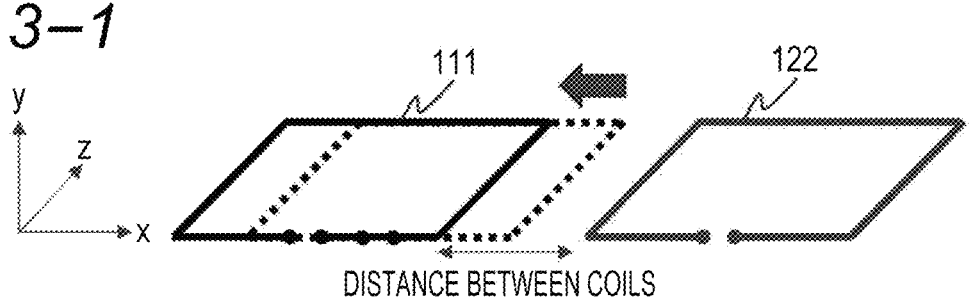
Figures 2, 3:
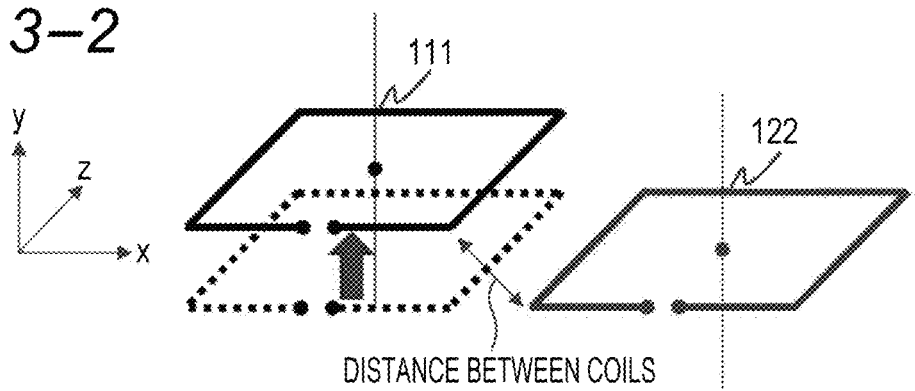
Figure 3:
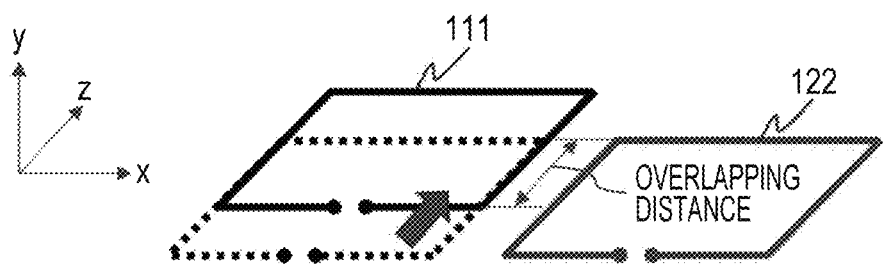
Figures 3, 4:
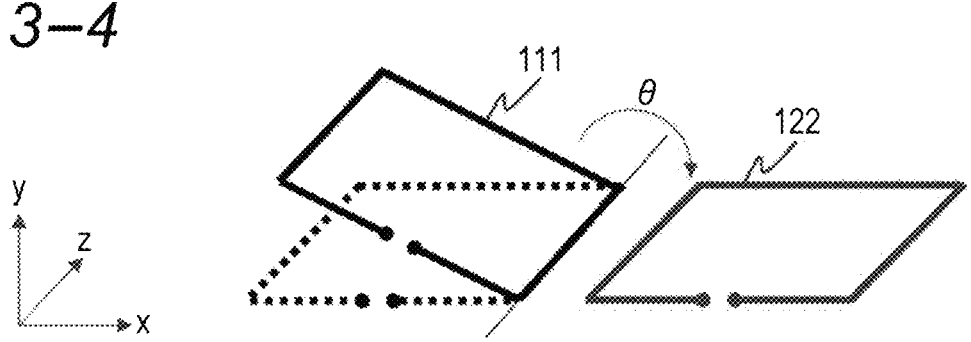
Figure 4:
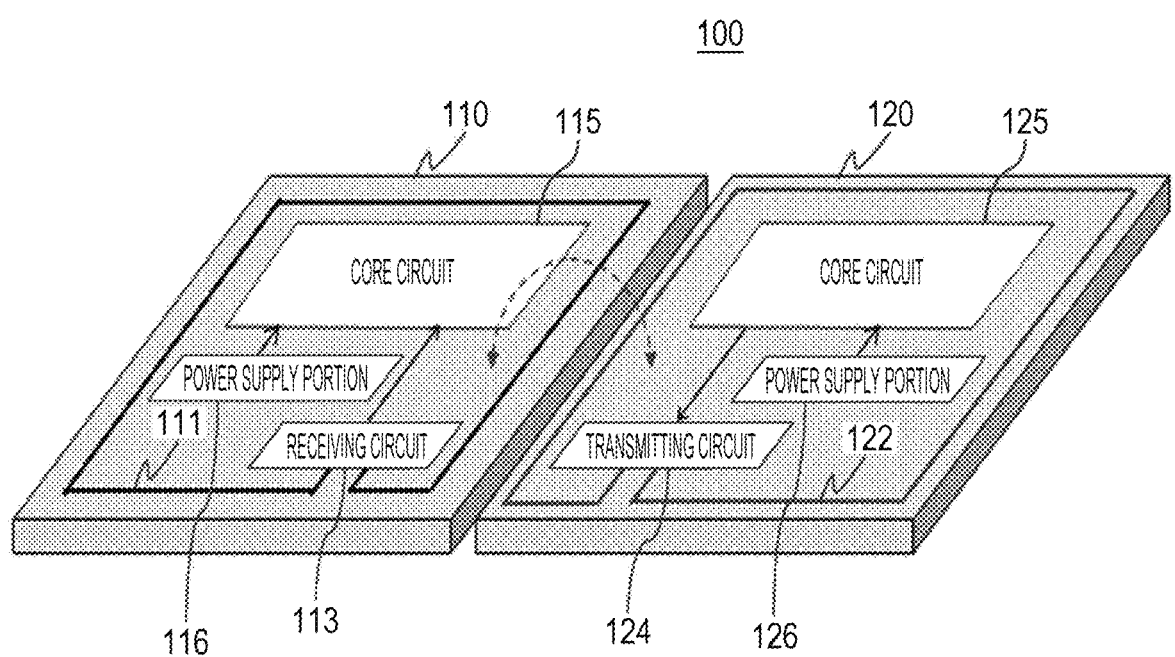

FIGS. 3-1 to 3-4 illustrate changes in the positional relationship between the transmitting coil 122 and the receiving coil 111 provided on the two chips. FIG. 3-1 illustrates the positional relationship of the coils in a situation where the chips 110 and 120 relatively move in directions away from each other (in X-axis directions away from each other) on the mount plane. In this case, the distance between the coils of the receiving coil 111 and the transmitting coil 122 increases, reducing the inductive coupling between the two coils. This reduces the amplitude (the maximum value of the absolute value of the detected voltage or current) of the voltage or current generated in the receiving coil caused by a change in the current generated in the transmitting coil 122. As an example of sensing, since the distance between the chips 110 and 120 slowly increases as described above when the base material 200 undergoes thermal expansion, a change in the environmental temperature can be detected when the amplitude of the voltage or current of the receiving coil detected by the detection portion changes at a lower rate (periodicity) than a predetermined value. Also, since a change in the pressure applied to the base material in an X-axis direction deforms the base material and changes the distance between the chips, a change in the pressure applied to the base material in an X-axis direction can also be detected when the detection portion detects a change in the amplitude of the voltage or current at a lower rate (periodicity) than a predetermined value as described above.

Furthermore, the distance between the coils described above changes with a high periodicity when vibration is applied to the base material 200 in the X-axis directions as viewed in the figure. As such, vibration (pulse, sound, or other vibration) applied to the base material can be detected when the detection portion detects a change in the voltage or current with a higher periodicity than a predetermined value.

FIG. 3-2 illustrates the positional relationship of the coils in a situation where the chips 110 and 120 relatively move away from each other in directions along winding axes of the coils (Y-axis directions). In this case, the distance between the coils of the receiving coil 111 and the transmitting coil 122 increases as the above movement takes place, reducing the inductive coupling between the two coils. This reduces the amount of change in the voltage or current occurring in the receiving coil due to a change in the current generated in the transmitting coil 122. Thus, the distance between the coils described above changes with a high periodicity when vibration is applied to the base material 200 in the Y-axis directions as viewed in the figure. As such, vibration (pulse, sound, or other vibration) applied to the base material can be detected when the detection portion detects a change in the voltage or current with a higher periodicity than the predetermined value.

FIG. 3-3 illustrates the positional relationship of the coils in a situation where the chips 110 and 120 relatively move to slide in front-rear directions (Z-axis directions) relative to each other on the mount plane. In this case, the coil overlapping distance of the sides of the receiving coil 111 and the transmitting coil 122 that are opposed to each other decreases as the above movement takes place, reducing the inductive coupling between the two coils. This reduces the amplitude of the voltage or current generated in the receiving coil due to a change in the current generated in the transmitting coil 122. Accordingly, the distance between the coils described above changes with a high periodicity when vibration is applied to the base material 200 in the Z-axis directions as viewed in the figure. As such, vibration (pulse, sound, or other vibration) applied to the base material can be detected when the detection portion detects a change in the voltage or current at a higher rate (periodicity) than a predetermined value.

FIG. 3-4 illustrates the positional relationship of the chips in a situation where the chips 110 and 120 rotate in a direction that reduces the relative angle between the chips about the rotation axis extending in the direction of the sides of the chips that are opposed to each other (Z axis) to change their relative position such that the relative angle between the chips is a predetermined angle θ less than 180 degrees. In this case, as disclosed in Patent Literature 1, it is known that as the relative angle θ of the coils described above decreases, the coupling coefficient between the receiving coil 111 and the transmitting coil 122 monotonically increases, and the amplitude of the voltage or current generated in the receiving coil due to a change in the current generated in the transmitting coil 122 increases. Accordingly, the relative angle between the coils described above changes with a high periodicity when vibration is applied to the base material 200 about the Z axis as viewed in the figure. As such, vibration (pulse, sound, or other vibration) applied to the base material can be detected when the detection portion detects a change in the voltage or current at a higher rate (periodicity) than the predetermined value.

FIG. 4 illustrates an example of a detailed mount circuit of the information processing apparatus 100 illustrated in FIGS. 1 and 2. As illustrated in the figure, the transmitting coil 122, which is located at the periphery of the chip, a transmitting circuit 124, which outputs a current signal to the transmitting coil, a core circuit 125 (transmission control portion 128), which generates a current signal, and the power supply portion 126, which supplies power to the core circuit, are mounted on the chip 120. The chip 110 includes the receiving coil 111, which is placed at the periphery of the chip, a receiving circuit 113, which receives the voltage or current applied to the receiving coil, a core circuit 115 (detection portion 117), which detects the voltage or current received by the receiving circuit 113, and the power supply portion 116, which supplies power to the core circuit 115. The core circuits 115 and 125 are configured with a CPU, for example. The core circuit 125 on the transmitting side has the function of the transmission control portion 128 and generates a transmission signal illustrated in FIG. 5 described below. The transmitting circuit 124 outputs a current according to the transmission signal to the transmitting coil.

Figure 5:
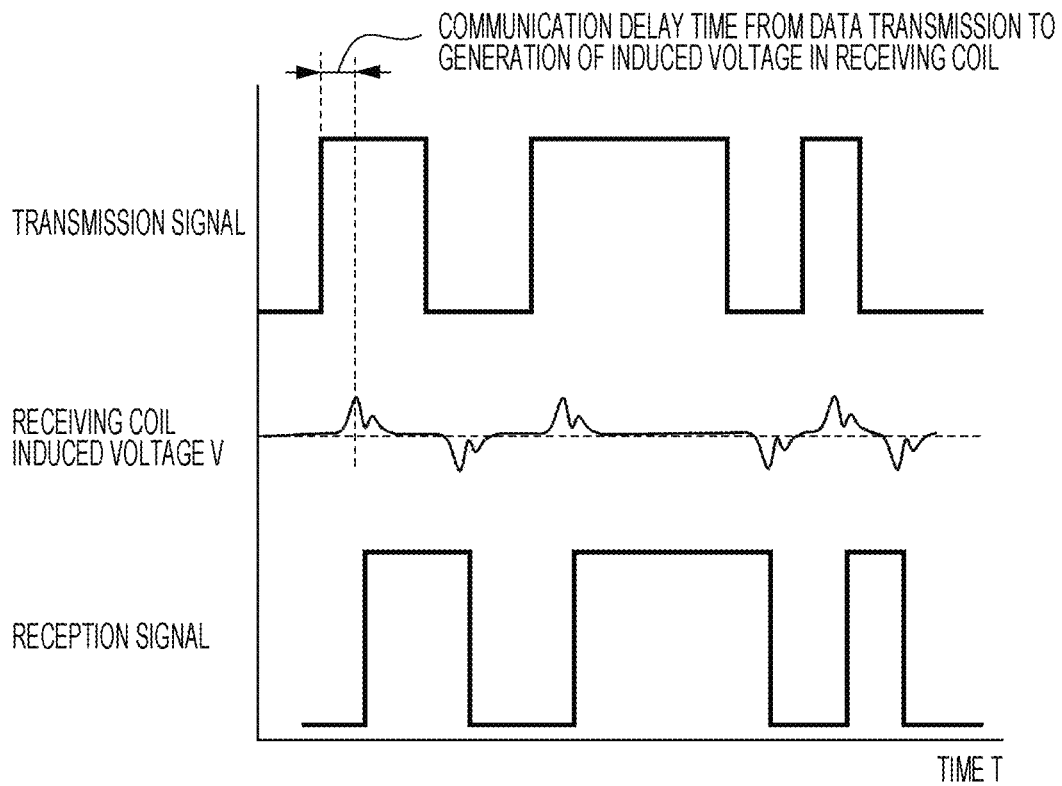
FIG. 5 is a diagram illustrating time changes of a transmission signal of the transmission-side chip, the induced voltage V of the receiving coil, and a reception signal of the reception-side chip of the present embodiment.

FIG. 5 illustrates time changes of the transmission signal generated by the core circuit 125 of the transmission-side chip, the voltage V generated in the receiving coil 111 of the reception-side chip, and the reception signal generated in the core circuit 115 (detection portion) of the receiving chip. The transmission signal is a binary signal (pulse signal) of High or Low, and a positive voltage V is generated in the receiving coil after a lapse of delay time from the time at which the pulse of the transmission signal rises from Low to High. The detection portion (core circuit 115) causes the reception signal to rise from Low to High when this voltage exceeds a predetermined positive threshold. Similarly, when the transmission signal changes from High to Low, a negative voltage V is generated in the receiving coil after a lapse of delay time. The detection portion (core circuit 115) changes the reception signal from High to Low when this voltage V falls below a predetermined negative threshold.

Figure 6:
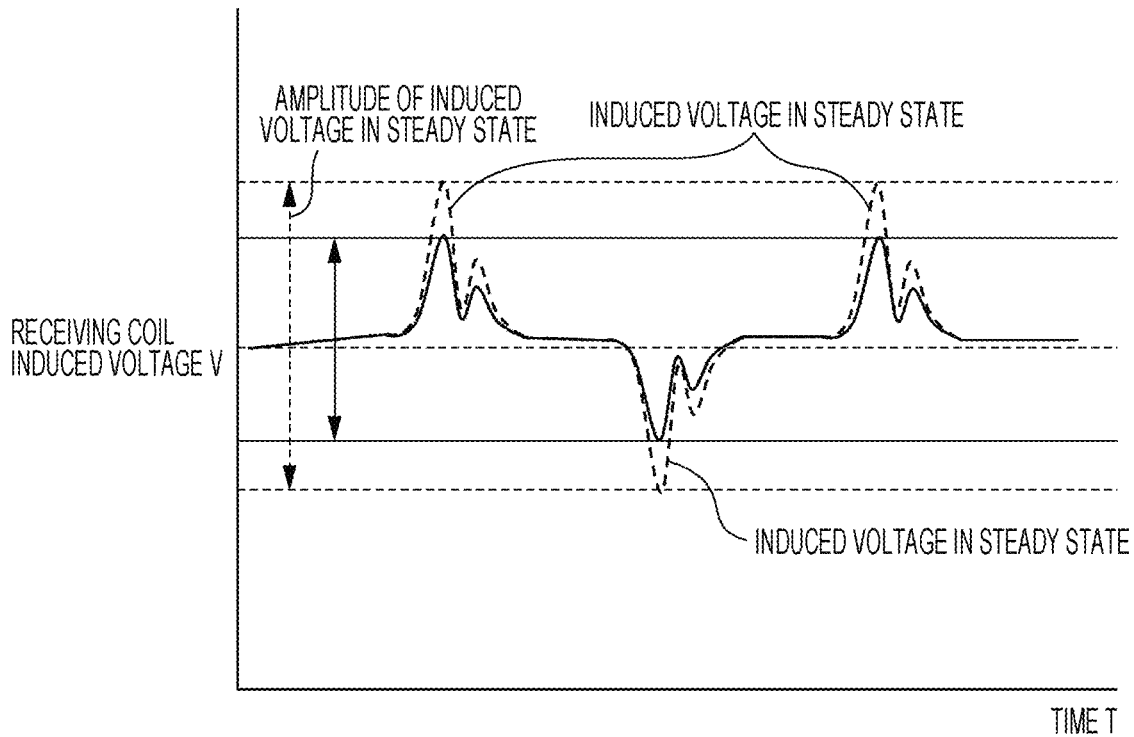
FIG. 6 is a diagram illustrating an example of time changes in the induced voltage V generated in the receiving coil when the positional relationship of the chips of the present embodiment changes.

FIG. 6 illustrates an example of time change of the voltage V generated in the receiving coil in a situation where the positional relationship of the chips has changed. As compared to the voltage V (dotted line) in a steady state before the positional relationship between the chips changes, in a situation where the positional relationship between the coils of the chips has changed as illustrated in FIGS. 3-1 to 3-3 and thus the coupling coefficient of inductive coupling has decreased, the amplitude of the voltage V generated in the receiving coil as the reception signal changes (High to Low or Low to High) becomes less than the predetermined amplitude value of a steady state in which the positional relationship of the chips remains unchanged. (Conversely, in a situation where the positional relationship between the coils of the chips has changed and the coupling coefficient of inductive coupling has increased, the amplitude of the voltage V generated in the receiving coil as the reception signal changes (High to Low, or Low to High) becomes greater than the amplitude in a steady state.) The pulse period of the transmission signal is 0.2 ns, for example, and sufficiently shorter than the period in which the positional relationship between the coils of the chip changes. As such, a change in the coupling coefficient of the inductive coupling can be detected based on a change in the amplitude of the voltage V, and a change in the positional relationship between the chips can be estimated based on this change in the coupling coefficient. In other words, it is possible to detect a state quantity, such as vibration, pressure change, or temperature change, that causes a change in the positional relationship between chips. The values of the amplitude of the voltage V in a steady state and the amplitude of the voltage V in a situation where the above state quantity has changed are determined according to the positional relationship between the chips that communicate. As such, the values can be set appropriately in the information processing apparatus after the positional relationship of the chips is determined, for example, during operation as a sensor.

The example illustrated in FIG. 6 is an example in which a change in the positional relationship between chips, vibration, pressure change, or temperature change is detected based on a state in which the amplitude of the induced voltage generated in the receiving coil increases or decreases relative to the predetermined value in a steady state. However, the present invention is not limited to this, and a change in the positional relationship between chips, vibration, pressure change, or temperature change may be detected based on the amplitude of the current value generated in the receiving coil. Also, the state quantities described above may be detected based on the amplitude of the waveform distortion of the reception signal detected by the detection portion (illustrated in FIG. 5), instead of the voltage or current generated in the receiving coil.

Figure 7:
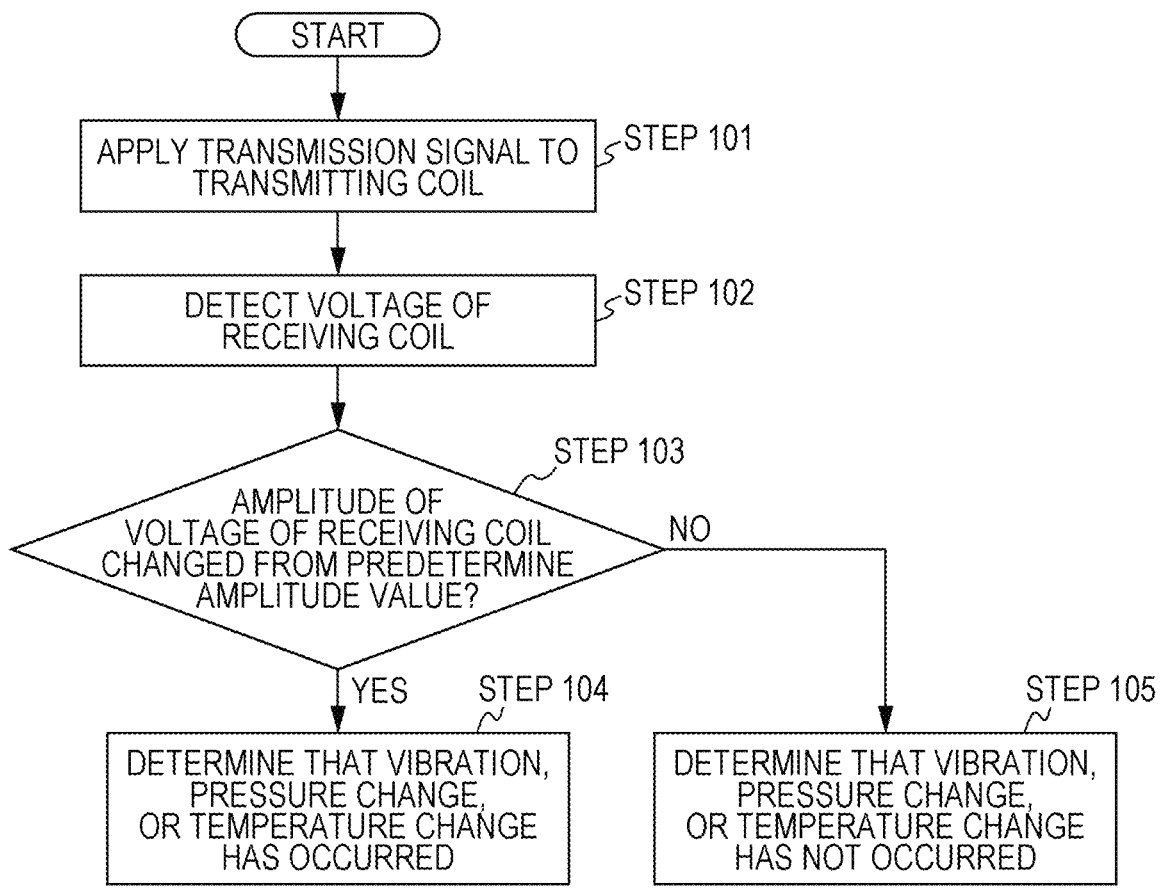
FIG. 7 is a diagram illustrating a flowchart of an operation of the information processing apparatus of the present embodiment detecting a state quantity such as vibration.

FIG. 7 illustrates the flowchart of an operation of the information processing apparatus of the present embodiment detecting a state quantity such as vibration. First, the core circuit 125 of the transmission-side chip applies a transmission signal (current), which is to be sent to the reception-side chip via wireless communication, to the transmitting coil (step 101). The core circuit 115 of the receiving chip then detects the voltage generated in the receiving coil (step 102). Then, it is determined whether the voltage amplitude detected at step 102 has changed from the predetermined amplitude value that is set in advance. If the amplitude has changed, the process proceeds to step 104. If not, the process proceeds to step 105 (step 103). Then, if it is determined at step 103 that the amplitude of the detected voltage has changed from the predetermined amplitude value that is set in advance, it is determined that vibration, pressure change, or temperature change has occurred (step 104). Here, it is also possible to detect vibration, pressure change, and temperature change individually based on the period of change in the amplitude of the detected voltage. As an example of this, vibration is determined to have occurred when the period of change in voltage amplitude is up to about 1 second, pressure change is determined to have occurred when the period of change in voltage amplitude is 1 to 10 seconds, and temperature change is determined to have occurred when the period of change in voltage amplitude is 10 seconds or longer. If it is determined at step 103 that the amplitude of the detected voltage has not changed from the predetermined amplitude value that is set in advance, it is determined that vibration, pressure change, or temperature change has not occurred (step 105).

Example 1 describes an embodiment in which the chip 120, which transmits a transmission signal, includes the transmission control portion 128 that is configured with a CPU or the like. However, the present invention is not limited to this, and the transmission control portion 128 may be configured with, instead of a CPU, a circuit that transmits predetermined transmission signals.

Example 2

While Example 1 above illustrates an example in which a change in the relative positional relationship of two coils that communicate wirelessly through inductive coupling is detected, this example describes an embodiment in which wireless communication is performed between three or more chips to detect a change in the relative positional relationship. The parts that are given the same reference numerals as those described in Example 1 have the same function as those in Example 1 and are not described.

Figure 8:
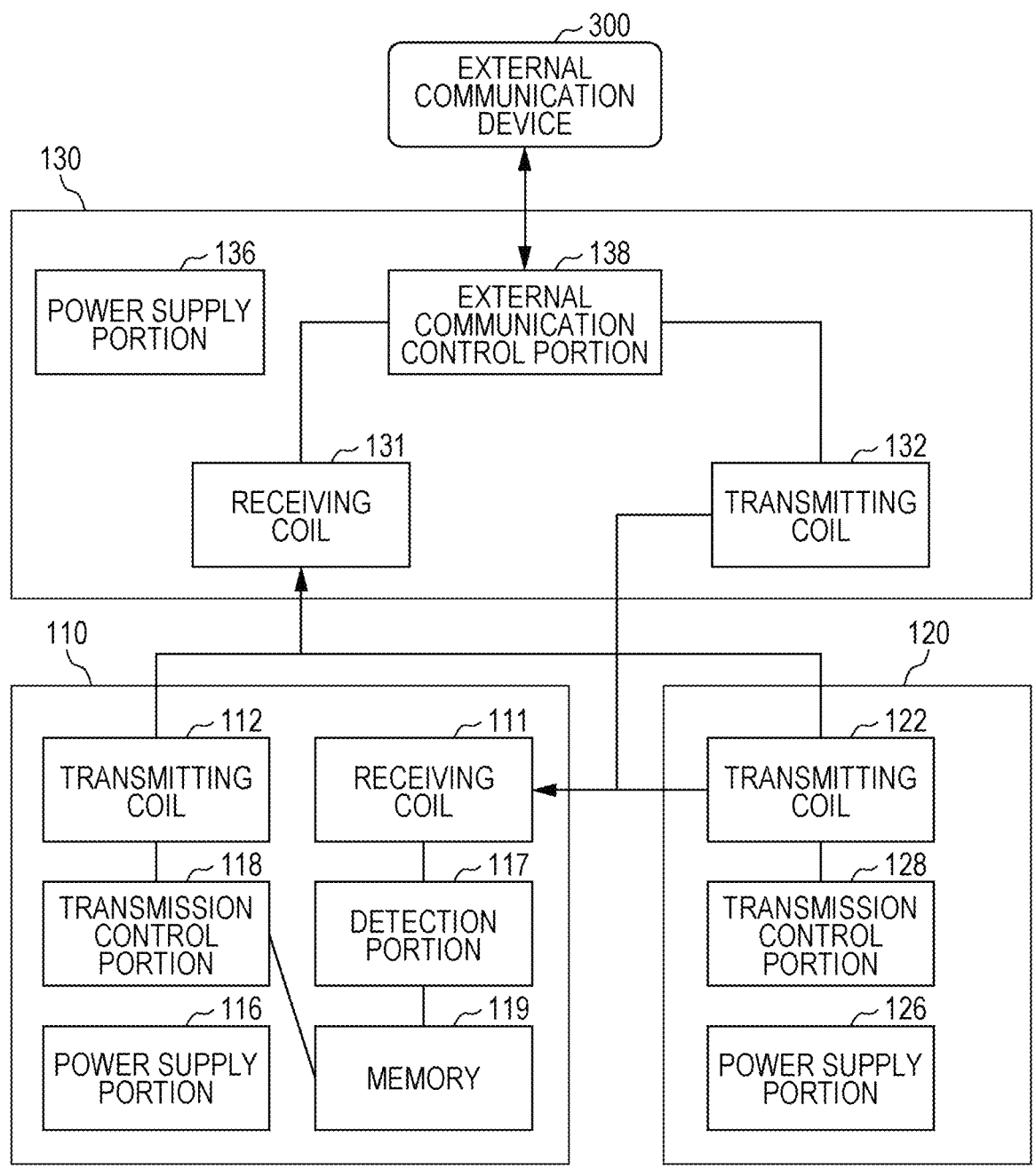
FIG. 8 is a diagram illustrating an example of the functional configuration of an information processing apparatus 100 of Example 2.

FIG. 8 illustrates an example of the functional configuration of an information processing apparatus 100 of Example 2. As illustrated in FIG. 8, the information processing apparatus 100 of the present embodiment includes at least three chips 110, 120, and 130. In addition to the receiving coil 111, the detection portion 117, and the power supply portion 116, the chip 110 includes a transmitting coil 112, a transmission control portion 118, which generates a transmission signal to be sent from the transmitting coil 112, and a memory 119, which records therein detection information of the state quantity detected by the detection portion 117. The detection portion 117, the transmission control portion 118, and the memory 119 may be configured with a CPU, for example.

The chip 130 includes a receiving coil 131, a transmitting coil 132, an external communication control portion 138, and a power supply portion 136, and communicates with an external communication device 300 via the external communication control portion. The external communication control portion, which is configured with a CPU, for example, transmits an output request signal for detection information via the transmitting coil 132 when it receives an output request for detection information from the external communication device. This output request signal is received by the receiving coil 111 of the chip 110. Based on this output request signal, the transmission control portion 118 reads the detection information recorded in the memory 119 and outputs the read detection information via the transmitting coil 112. The external communication control portion receives the detection signal via the receiving coil 131 and outputs the detection signal to the external communication device 300.

The transmission signal transmitted from the transmitting coil provided on each chip is received by the receiving coils on all adjacent chips. In other words, the transmitting coils and the receiving coils provided on adjacent chips function similarly to a communication bus.

Figure 9:
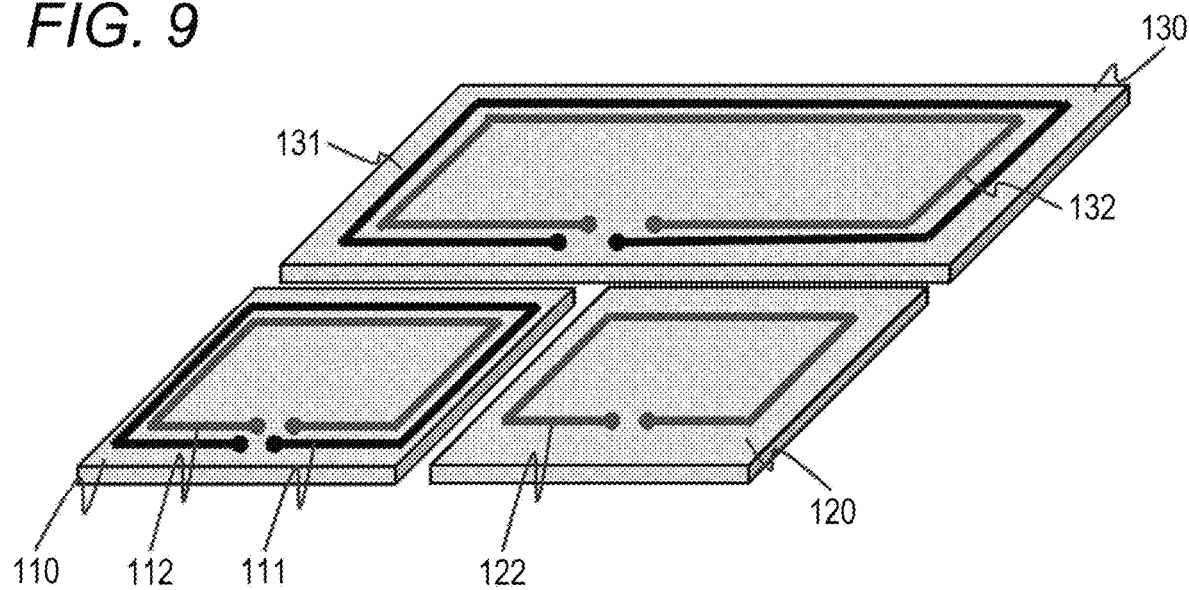
FIG. 9 is hardware configuration diagram for illustrating the principle of wireless communication by chips 110, 120, and 130 in Example 2.

FIG. 9 is a hardware configuration diagram for illustrating the principle of wireless communication by the chips 110, 120, and 130 in Example 2. As illustrated in FIG. 9, the chip 120 is adjacent to the chips 110 and 130, so that a transmission signal sent from the transmitting coil 122 is received by both receiving coils 111 and 131.

Figure 10:
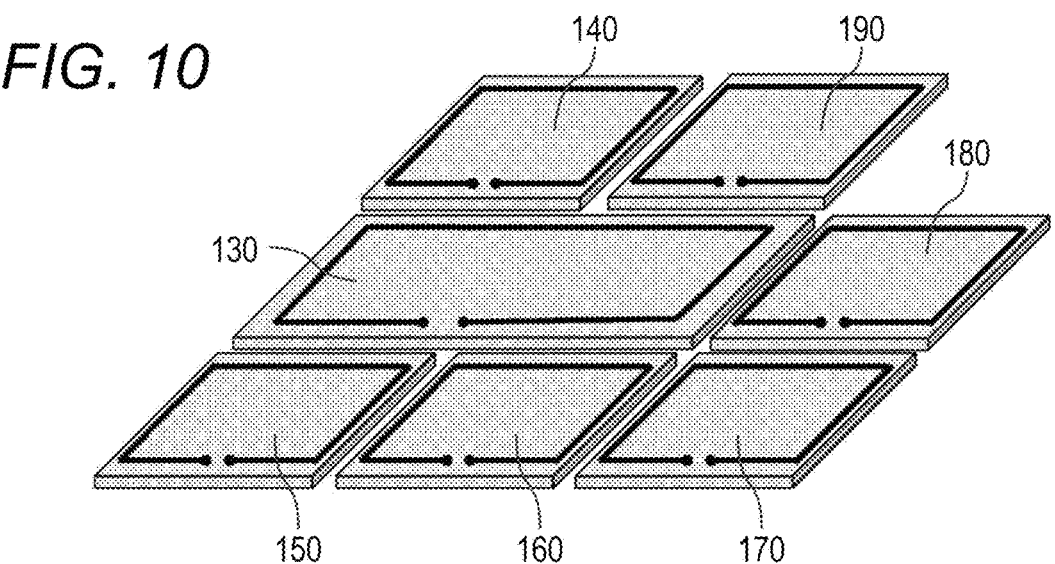
FIG. 10 is a diagram illustrating an example in which many chips are placed such that they can communicated with one another in Example 2.

FIG. 10 illustrates an example in which more chips, namely seven chips are arranged to be capable of communicating with one another. In the arrangement configuration illustrated in FIG. 10, a transmission signal transmitted from the chip 130 can be received by other adjacent chips (140, 150, 160, 170, 180, 190).

Example 3

While Examples 1 and 2 above illustrate examples in which a plurality of chips are arranged adjacent to each other on a plane, this example describes an embodiment in which a change in relative positional relationship is detected in a situation where a plurality of chips are stacked in a direction that causes the chip surfaces to be directly opposite each other and wireless communication is performed between the chips. The parts that are given the same reference numerals as those described in Example 1 or 2 have the same functions as those in Example 1 and are not described.

Figure 11:
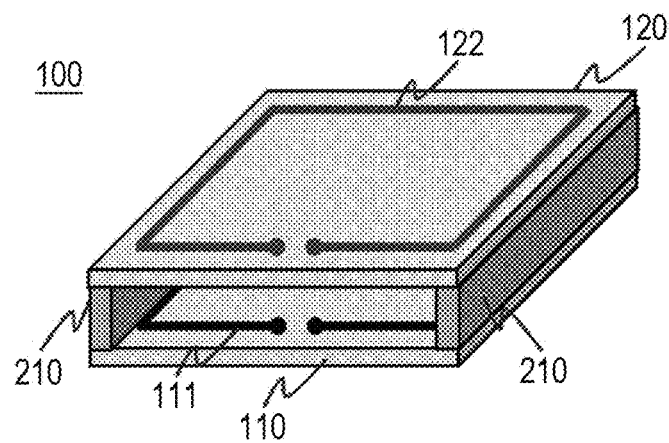
FIG. 11 is a hardware configuration diagram for illustrating the principle of wireless communication by chips 110 and 120 in Example 3.

FIG. 11 is a hardware configuration diagram for illustrating the principle of wireless communication between chips 110 and 120. The chips 110 and 120 are positioned such that the receiving coil 111 of the chip 110 and the transmitting coil 122 of the chip 120 are directly opposite each other, enabling wireless communication through the inductive coupling between the two coils.

The example illustrated in FIG. 11 also illustrates an example in which the chips 110 and 120 are fixed in close proximity to each other with the base material 210 interposed therebetween and thus positioned at a distance that enables inductive coupling. This base material may be formed by a deformable elastic member, for example. In this case, since the positional relationship between the chips 110 and 120 changes, not only the electric signal transmitted from the transmitting coil, but also a change in the positional relationship between the chips 110 and 120 changes the voltage or current in the receiving coil. As such, it is possible to detect vibration, pressure change, or temperature change by detecting, with the detection portion 117 of the chip 110, a change in the voltage or current occurring in the receiving coil due to a change in the positional relationship of the chips described above, more specifically, based on the amplitude of the value of the voltage or current generated in the receiving coil.

Figures 1, 12:
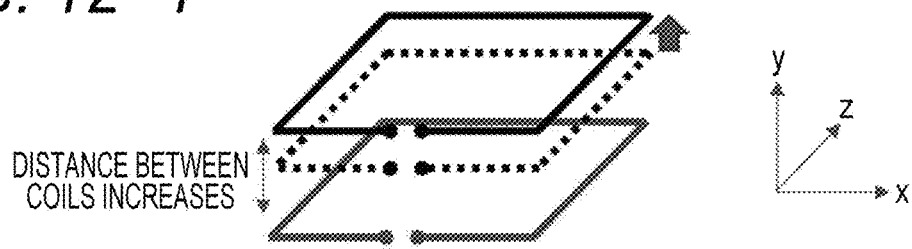
Figures 2, 12:
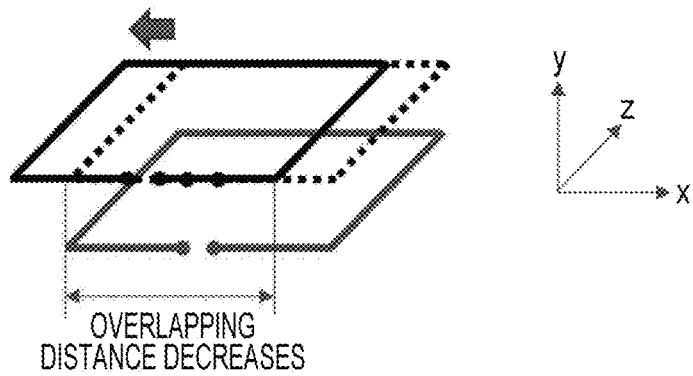
Figures 3, 12:
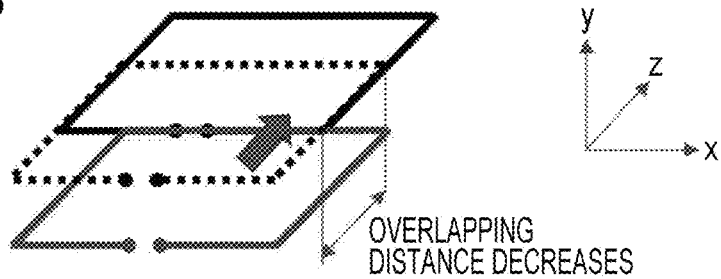
Figures 4, 12:
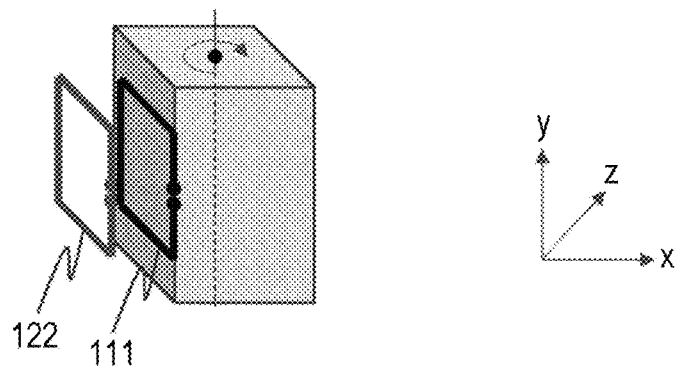

FIGS. 12-1 to 12-4 illustrate changes in the positional relationship between the transmitting coil 122 and the receiving coil 111 provided on the two chips. FIG. 12-1 illustrates the positional relationship of the coils in a situation where the chips 110 and 120 relatively move in directions away from each other (in Y-axis directions away from each other). In this case, the coil distance between the receiving coil 111 and the transmitting coil 122 increases, reducing the inductive coupling between the two coils. This reduces the amount of change in the voltage or current generated in the receiving coil due to a change in the current generated in the transmitting coil 122. As an example of sensing, since the distance between the chips 110 and 120 slowly increases as described above when the base material 210 undergoes thermal expansion, a change in the environmental temperature can be detected when the detection portion detects a change in voltage or current with a lower periodicity than a predetermined value. Also, since a change in the pressure applied to the base material in a Y-axis direction deforms the base material and changes the distance between the coils, a change in the pressure applied to the base material in a Y-axis direction can also be detected when the detection portion detects a change in voltage or current with a lower periodicity than a predetermined value as described above.

Thus, the distance between the coils described above changes with a high periodicity when vibration is applied to the base material 210 in the Y-axis directions as viewed in the figure. As such, vibration (pulse, sound, or other vibration) applied to the base material can be detected when the detection portion detects a change in the voltage or current with a higher periodicity than a predetermined value.

FIG. 12-2 is a diagram illustrating the positional relationship of the coils in a situation where the chips 110 and 120 slide relative to each other in the X-axis directions. In this case, the coil overlapping distance of the sides of the receiving coil 111 and the transmitting coil 122 that are opposed to each other decreases as the above movement takes place, reducing the inductive coupling between the two coils. This reduces the amount of change in the voltage or current generated in the receiving coil due to a change in the current generated in the transmitting coil 122. Accordingly, the distance between the coils described above changes with a high periodicity when vibration is applied to the base material 210 in the X-axis directions as viewed in the figure. As such, vibration (pulse, sound, or other vibration) applied to the base material can be detected when the detection portion detects a change in the voltage or current with a higher periodicity than a predetermined value.

FIG. 12-3 is a diagram illustrating the positional relationship of the coils in a situation where the chips 110 and 120 slide relative to each other in the Z-axis directions. In this case, the coil overlapping distance of the sides of the receiving coil 111 and the transmitting coil 122 that are opposed to each other decreases as the above movement takes place, reducing the inductive coupling between the two coils. This reduces the amount of change in the voltage or current generated in the receiving coil due to a change in the current generated in the transmitting coil 122. Accordingly, the distance between the coils described above changes with a high periodicity when vibration is applied to the base material 210 in the Z-axis directions as viewed in the figure. As such, vibration (pulse, sound, or other vibration) applied to the base material can be detected when the detection portion detects a change in the voltage or current with a higher periodicity than a predetermined value.

FIG. 12-4 is a diagram illustrating the positional relationship of the coils in a situation where the chip 110 is placed on the rotor side of a rotary member, the chip 120 is placed on the stator side of the rotary member, and the rotor rotationally moves relative to the stator. In this case, the rotational movement of the rotor relative to the stator repeats a relative position state in which the transmitting coil 111 and the receiving coil 122 are directly opposite each other (state illustrated in FIG. 12-4) and a relative position state in which they are not directly opposite each other (e.g., a state in which the rotor has rotated 180 degrees from the state illustrated in FIG. 12-4). Accordingly, along with the above rotational movement, the inductive coupling between the coils increases when the receiving coil 111 and the transmitting coil 122 are directly opposite each other, and the inductive coupling between coils decreases when the receiving coil 111 and the transmitting coil 122 are not opposite each other. Thus, the distance between the coils changes with the period corresponding to the number of rotations as the rotor rotates, enabling the detection of the number of rotations (rotation speed) of the rotor of a motor, for example.

Example 4

The above examples describe an example in which a plurality of chips are placed in close proximity to one another with the base material interposed therebetween to form a sensor. An example is now described in which a plurality of chips are not fixed to predetermined positions on the base material and a sensor is manufactured more easily using a plurality of chips. The parts that are given the same reference numerals as those described in Example 1 or 2 have the same functions as those in Example 1 or 2 and are not described.

Figure 13:
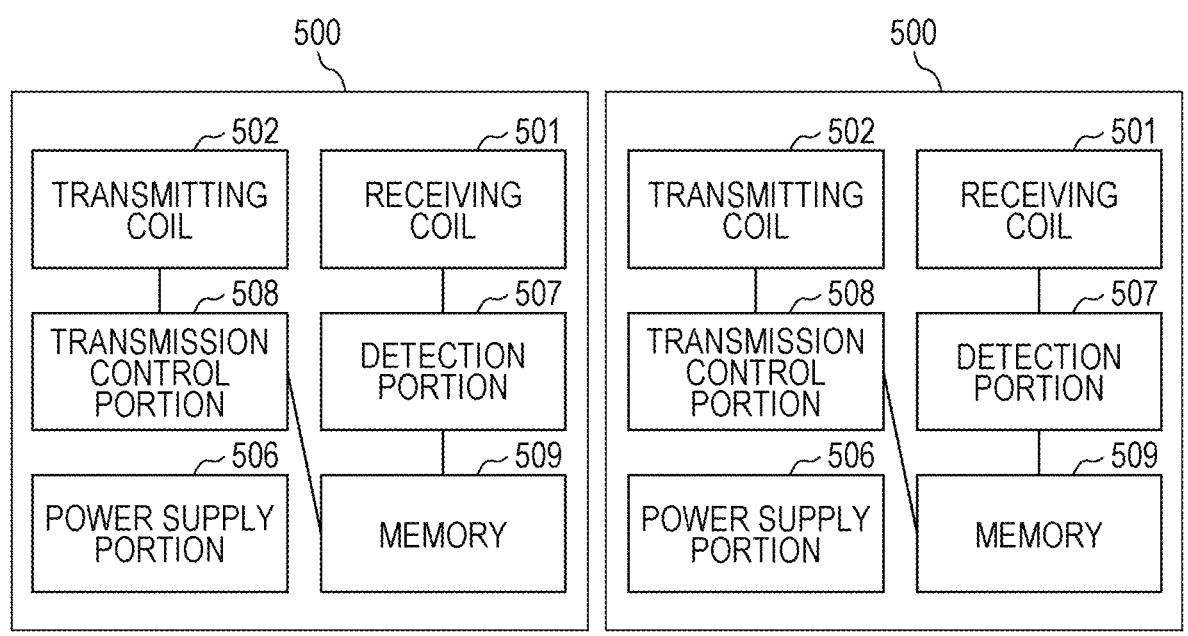
FIG. 13 is a diagram illustrating the functions of chips 500 of Example 4.

FIG. 13 illustrates the functions of chips 500 of the present embodiment. Each chip 500 includes a receiving coil 501, a transmitting coil 502, a power supply portion 506, a detection portion 507, a transmission control portion 508, and a memory 509. The functions of these functional blocks are the same as those of the examples described above. As such, when a plurality of chips 500 are positioned in close proximity to one another that enables communication, the chips communicate wirelessly, and a change in the relative position of the chips can be detected. The detection portion 507, the transmission control portion 508, and the memory 509 may be configured with a CPU.

Figure 14:
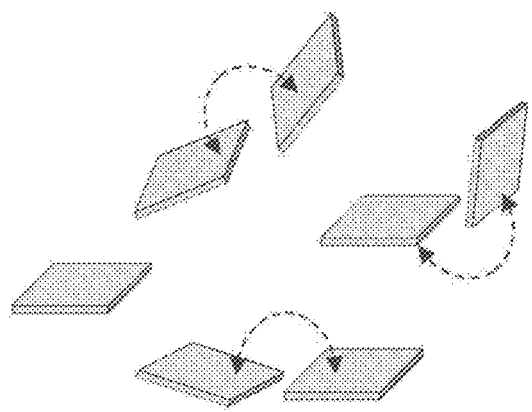
FIG. 14 is a diagram illustrating a state of wireless communication between a plurality of chips in a situation where the chips of Example 4 are mixed in a material.

For example, when two or more chips 500 are mixed into a material, such as cement or rubber, of a construction member in a large quantity, even though it is not possible to control the positions where the chips are fixed, chips that are fixed at proximal positions can wirelessly communicate. FIG. 14 is a diagram illustrating a state of wireless communication between a plurality of chips in a situation where the chips are mixed in a material. As illustrated in FIG. 14, chips positioned in close proximity can wirelessly communicate with each other, enabling detection of changes in the relative positions of the chips. For example, when a rubber sheet having chips 500 mixed therein is used as a flooring material, a change in pressure at any position in the flooring material can be detected. Vibration applied to the material having the chips 500 mixed therein or its temperature change can also be detected in the same manner.

Figure 15:
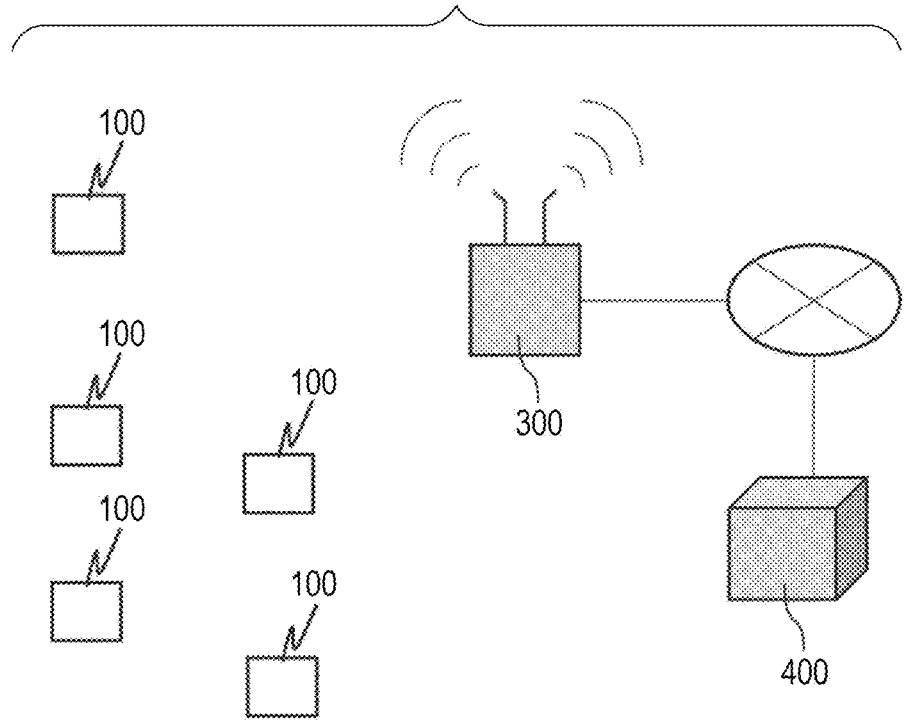
FIG. 15 is a configuration diagram of an information analysis system using a plurality information processing apparatuses 100.

FIG. 15 illustrates a diagram of an information analysis system using a plurality of information processing apparatuses 100. In each of the above-described embodiments, detection information such as vibration, pressure change, or temperature change detected by the information processing apparatuses 100 is collected by the external communication device 300 and transmitted to a cloud server 400 through a line of communication. The cloud server can analyze a large amount of detection information and generate statistical information. Each of the above-described embodiments describes an example in which the detection portion in a chip has the function of detecting a change in the relative positions between chips, vibration applied to chips, pressure change, or temperature change. Instead, the detection portion of the chip may have the function of detecting the voltage or current, and the external communication device 300 or the cloud server 400 that obtains the detection information of voltage or current from the chip may have the function of detecting a change in the relative positions between chips, vibration applied to chips, pressure change, or temperature change based on a predetermined condition that the amplitude of the voltage value or the current value of the detection information increases or decreases from a predetermined value.

The above embodiments allow the computing chip itself, which accompanies as a necessary element to configure the sensor system, to serve as a sensing device, enabling the construction of a chip-size sensor system without the need to separately provide a computing chip and a sensing device. Furthermore, since changes in the relative positional relationship between chips can be measured, any physical quantity can be measured if it can be linked to changes in this relative positional relationship. Additionally, by replacing the software implemented on the computing chip, it is possible to operate as different types of sensors, thereby reducing the design cost of the sensor system and allowing a single sensor device to measure a plurality of physical quantities.

The above examples describe that state quantities such as vibration, pressure change, or temperature change are estimated by detecting changes in the voltage or current generated in the receiving coil due to changes in the relative position of the chips. However, the voltage or current generated in the receiving coil is known to change when electromagnetic waves are applied. As such, it is also possible to measure electromagnetic waves applied to the information processing apparatus by detecting changes in the voltage or current generated in the receiving coil.

The above description of the embodiments is intended to facilitate understanding of the invention and is not intended to limit the interpretation of the invention. The invention may be changed and improved without departing from its intent, and the invention also includes equivalents thereof.

REFERENCE SIGNS LIST

100 Information processing apparatus
110, 120, 130, 500 Chip
111, 121, 131, 501 Receiving coil
112, 122, 132, 502 Transmitting coil
113, 123, 133, 503 Receiving circuit
114, 124, 134, 504 Transmitting circuit
115, 125, 135, 505 Core circuit
126, 116, 136, 506 Power supply portion
117, 127, 137, 507 Detection portion
118, 128, 508 Transmission control portion
139, 509 Memory
200, 210 Base material
300 External communication device
400 Cloud server

The invention claimed is:

1. A chip that is a second chip in an information processing apparatus including a first chip and the second chip, wherein
the first chip includes
a first transmission control portion configured to generate a transmission signal and
a first transmitting coil that is connected to the first transmission control portion and configured to transmit the transmission signal,
the second chip includes
a second receiving coil configured to receive the transmission signal by being inductively coupled with the first transmitting coil,
a second detection portion configured to detect a voltage or current applied to the second receiving coil, and a memory configured to record therein detection information of the voltage or current detected by the second detection portion, the second detection portion is configured to, based on a change in the voltage or current occurring in the second receiving coil, detect
- a change in relative position between the first chip and the second chip, or
- one of vibration applied to the first chip or the second chip, pressure change, temperature change, or electromagnetic wave, and the second detection portion is configured to detect an increase or decrease, from a predetermined value, of an amplitude of the voltage or current generated when the second receiving coil receives the transmission signal.

2. The chip according to claim 1, wherein
the second detection portion is configured to detect, as a digital signal, a voltage or current that is an analog signal generated in the second receiving coil.

3. The chip according to claim 1, wherein
the second detection portion is configured with a CPU.

4. An information processing apparatus comprising:
the first chip and the second chip according to claim 1.

5. The information processing apparatus according to claim 4, further comprising:
a third chip including
a third transmitting coil,
a third receiving coil, and
an external communication control portion configured to communicate with an external communication device, wherein
the third chip is configured to receive the detection information via the third receiving coil and output the detection information to the external communication device through the external communication control portion.

6. The information processing apparatus according to claim 4, wherein
the first chip and the second chip are disposed adjacent to each other and at positions directly opposite each other with a base material interposed therebetween, and
the first transmitting coil and the second receiving coil are disposed at positions directly opposite each other.

7. The information processing apparatus according to claim 4, wherein
one of the first and second chips is disposed on side of a rotor of a rotary member,
the other of the first and second chips is disposed on side of a stator of the rotary member, and
the rotor is configured to rotationally move relative to the stator so as to repeat a relative position state in which the first transmitting coil and the second receiving coil are directly opposite each other and a relative position state in which the first transmitting coil and the second receiving coil are not directly opposite each other.

8. An information analysis system comprising:
the information processing apparatus according to claim 4; and
an analysis apparatus configured to analyze information obtained from the information processing apparatus.

9. A chip that is a second chip in an information processing apparatus including a first chip and the second chip, wherein
the second chip includes
a transmission control portion configured to generate a transmission signal,
a transmitting coil that is connected to the transmission control portion and configured to transmit the transmission signal,
a receiving coil configured to receive the transmission signal from the first chip, and
a detection portion configured to detect a voltage or current of the receiving coil, and
the detection portion is configured to detect, when a change in voltage or current occurring in the receiving coil satisfies a predetermined condition,
a change in relative position between the first chip and the second chip, or
vibration applied to the first chip or the second chip, temperature change, pressure change, or electromagnetic wave, and
the detection portion is configured to detect an increase or decrease, from a predetermined value, of an amplitude of the voltage or current generated when the receiving coil receives the transmission signal.

10. An information processing apparatus comprising:
the first chip and the second chip according to claim 9.

11. The chip according to claim 1, wherein
the second detection portion is configured to detect a period of change in the amplitude of the voltage.

12. The chip according to claim 1, wherein
the second receiving coil is configured to receive the transmission signal directly from the first transmitting coil.

13. The chip according to claim 9, wherein
the detection portion is configured to detect a period of change in the amplitude of the voltage.

14. The chip according to claim 9, wherein
the receiving coil is configured to receive the transmission signal directly from the first chip.

15. An information processing apparatus comprising:
a first chip and a second chip that are adjacent to each other, wherein
the first chip includes
a first transmission control portion configured to generate a transmission signal and
a first transmitting coil that is connected to the first transmission control portion and configured to transmit the transmission signal,
the second chip includes
a second receiving coil capable of receiving the transmission signal by being inductively coupled with the first transmitting coil and
a second detection portion configured to detect a voltage or current applied to the second receiving coil,
the first chip and the second chip are fixed to a base material,
the second detection portion is configured to, based on a change in voltage or current occurring in the second receiving coil, detect
a change in relative position between the first chip and the second chip, or
one of vibration applied to the first chip and the second chip, pressure change, temperature change, or electromagnetic wave, and
the second detection portion is configured to detect an increase or decrease, from a predetermined value, of an amplitude of the voltage or current generated when the second receiving coil receives the transmission signal.

16. The information processing apparatus according to claim 15, wherein
the base material fixed to the first chip and the second chip is a same base material.

17. The information processing apparatus according to claim 15, wherein
the second detection portion is configured to detect deformation of the base material, or
one of vibration applied to the base material, pressure change, or temperature change.

18. The information processing apparatus according to claim 15, wherein
the second detection portion is configured to detect a period of change in the amplitude of the voltage.

19. The information processing apparatus according to claim 15, wherein
the second receiving coil is configured to receive the transmission signal directly from the first transmitting coil.

* * * * *